(12) United States Patent
Anttila et al.

(10) Patent No.: US 7,435,473 B2
(45) Date of Patent: Oct. 14, 2008

(54) PRINTED SUBSTRATE AND PRINTING METHOD

(75) Inventors: Mika Anttila, Masku (FI); Olli Hakkila, Espoo (FI); Markku Merilahti, Tampere (FI); Anna-Liisa Tammi, Paimio (FI); Pertti Ahonen, Helsinki (FI)

(73) Assignees: UPM-KYMMENE OYJ, Helsinki (FI); Ciba Speciality Chemical Corporation, Tarrytown, NY (US)

( * ) Notice: Subject to any disclaimer, the term of this patent is extended or adjusted under 35 U.S.C. 154(b) by 18 days.

(21) Appl. No.: 11/022,047

(22) Filed: Dec. 23, 2004

(65) Prior Publication Data

US 2005/0191469 A1 Sep. 1, 2005

Related U.S. Application Data

(63) Continuation of application No. PCT/EP02/07130, filed on Jun. 27, 2002.

(51) Int. Cl.
*B32B 7/02* (2006.01)
*B31F 1/07* (2006.01)
*B41F 19/02* (2006.01)
*B44F 5/00* (2006.01)
*B41C 1/06* (2006.01)

(52) U.S. Cl. ............ 428/212; 428/195.1; 428/323; 428/537.5; 428/688; 101/5; 101/34

(58) Field of Classification Search ............ 428/32.21, 428/32.31, 32.34, 32.35, 195.1, 212, 323, 428/537.5, 688; 101/5, 34
See application file for complete search history.

(56) References Cited

U.S. PATENT DOCUMENTS

| 3,376,162 | A | | 4/1968 | Spencer et al. |
| 5,709,976 | A | * | 1/1998 | Malhotra ............ 428/32.11 |
| 5,863,639 | A | | 1/1999 | Franke et al. |
| 6,117,537 | A | | 9/2000 | Butters et al. |
| 6,251,175 | B1 | | 6/2001 | Zhu et al. |
| 6,616,749 | B1 | * | 9/2003 | Husband et al. ............ 106/486 |

FOREIGN PATENT DOCUMENTS

| DE | 19536797 | | 4/1996 |
| EP | 1101623 | | 5/2001 |
| WO | WO 99/51815 | * | 10/1999 |
| WO | WO 00/68021 | | 11/2000 |
| WO | WO 01/58697 | | 8/2001 |

* cited by examiner

*Primary Examiner*—Betelhem Shewareged
(74) *Attorney, Agent, or Firm*—Fitch, Even, Tabin & Flannery

(57) ABSTRACT

The invention refers to a printed substrate comprising a substrate with an oleophilic surface having a Gurley-Hill permeance value bigger than 5000 s/100 ml, the ink printed on the substrate having an IGT ink set-off value bigger than 0.60 print density units at 30 s delay time. The invention also refers to a printing method performed in at least one printing unit under use of following substrate/ink combination:
- the substrate has an oleophilic surface and is non-porous, i.e. has a Gurley-Hill permenace value bigger than 5000 s/100 ml,
- the pigment carrier/ink has an IGT ink set-off value larger than 0.60 print density units at 30 s delay time.

26 Claims, 6 Drawing Sheets

ISIT Tack Build-up curve

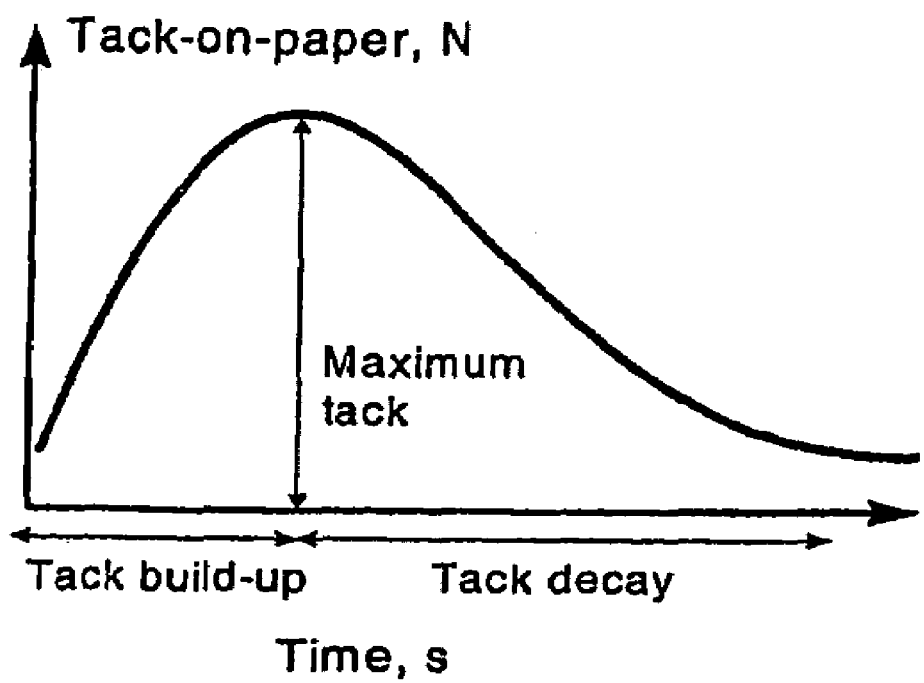
FIG. 1. ISIT Tack Build-up curve

FIG. 2. Legends and corresponding papers: Paper 12 = coating colour 3 / sample 12, Star = UPM Star 100 g/m$^2$, Ultra = UPM Ultra 70 g/m$^2$, Ultra M 70 = UPM Ultra M 70 g/m$^2$.
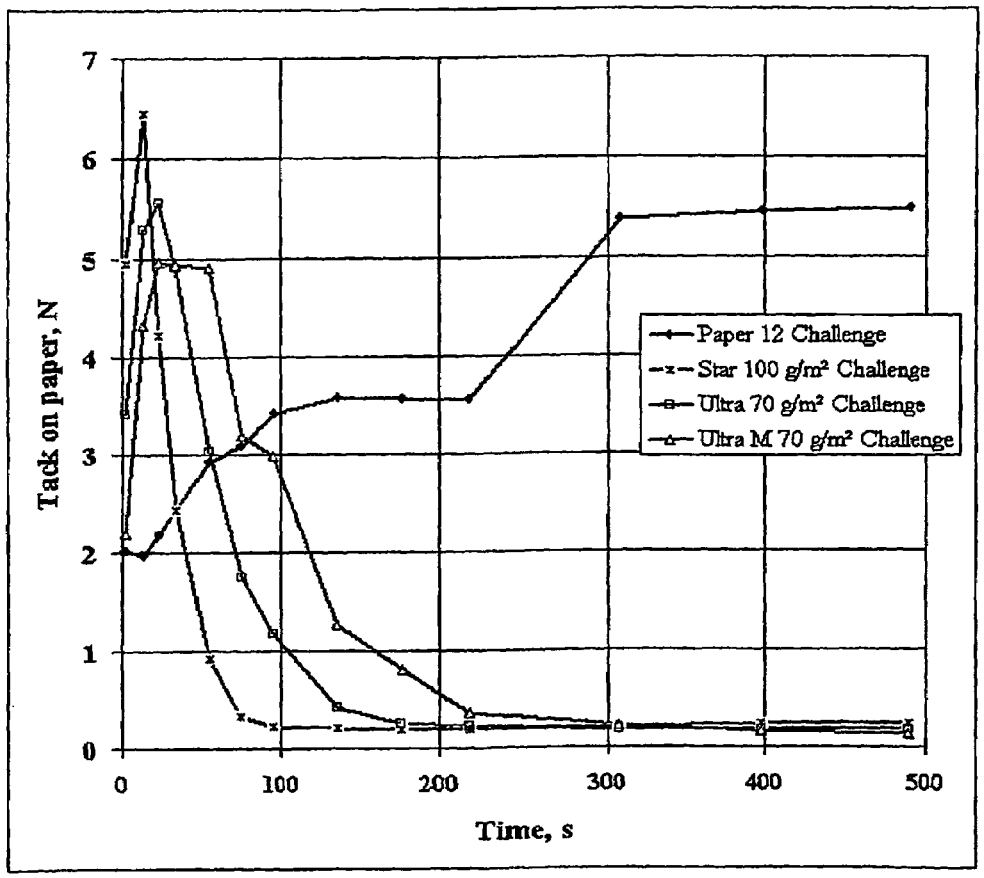
| ISIT set-up | | | |
|---|---|---|---|
| Printing speed (m/s): | 0.5 | Ink: | Sun Challenge |
| Contact hold time (s): | 0.5 | Ink amount (g/m$^2$): | 1.4 |
| Contact force (-): | 8 | | |
| Pull-off speed (-): | 5 | | |
| | Paper 12 | Star 100 g/m$^2$ | Ultra 70 g/m$^2$ | Ultra M 70 g/m$^2$ |
|---|---|---|---|---|
| Tack build-up (s): | 489.9 | 12.5 | 23.0 | 23.1 |
| Maximum tack (N): | 5.5 | 6.5 | 5.6 | 5.0 |
| Tack decay (s): | | 83 | 153 | 194 |

FIG. 3. Legends and corresponding papers: Max = UPM Max 56 g/m², Cote = UPM Cote 60 g/m², Paper 8 = coating colour 5 / sample 8, Paper 10 = coating colour 6 / sample 10.
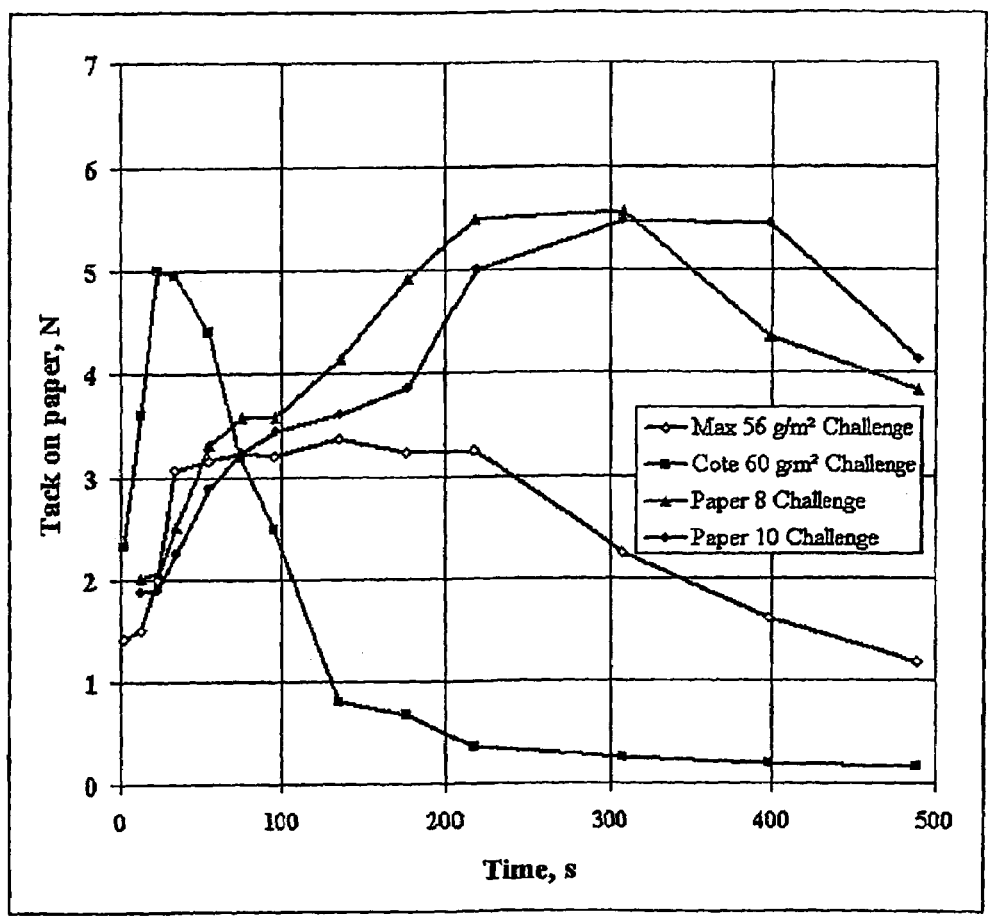
| ISIT set-up | | | |
|---|---|---|---|
| Printing speed (m/s): | 0.5 | Ink: | Sun Challenge |
| Contact hold time (s): | 0.5 | Ink amount (g/m²): | 1.4 |
| Contact force (-): | 8 | | |
| Pull-off speed (-): | 5 | | |
| | Max 56 g/m² | Cote 60 g/m² | Paper 8 | Paper 10 |
|---|---|---|---|---|
| Tack build-up (s): | 135.9 | 23.1 | 308.6 | 308.6 |
| Maximum tack (N): | 3.4 | 5.0 | 5.6 | 5.5 |
| Tack decay (s): | | 194 | | |

FIG. 4. Legends and corresponding papers: Paper 12 = coating colour 3 / sample 12, Star = UPM Star 100 g/m², Ultra = UPM Ultra 70 g/m², Ultra M = UPM Ultra M 70 g/m².
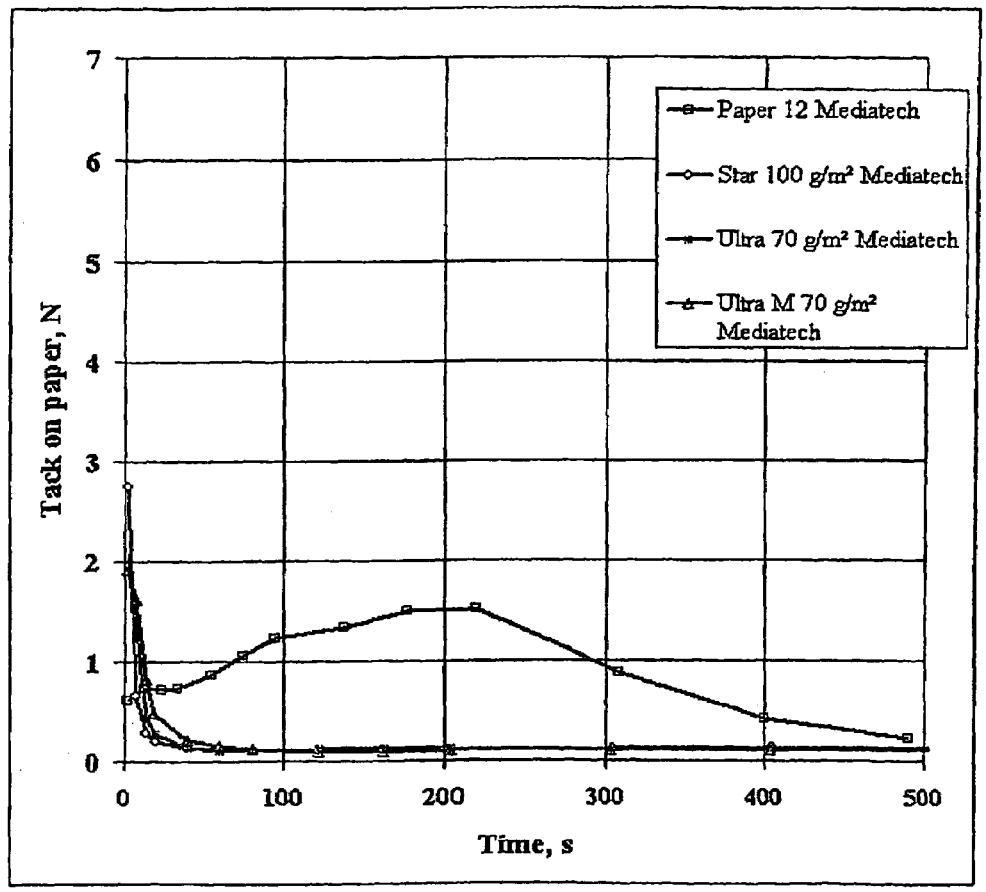
| ISIT set-up | | | |
|---|---|---|---|
| Printing speed (m/s): | 0.5 | Ink: | Sicpa Mediatech Ultra Fast |
| Contact hold time (s): | 0.5 | Ink amount (g/m²): | 1.5 |
| Contact force (-): | 8 | | |
| Pull-off speed (-): | 5 | | |
| | Paper 12 | Star 100 g/m² | Ultra 70 g/m² | Ultra M 70 g/m² |
|---|---|---|---|---|
| Tack build-up (s): | 217.9 | 1.9 | 1.9 | 1.9 |
| Maximum tack (N): | 1.5 | 2.7 | 2.0 | 1.9 |
| Tack decay (s): | 272 | 17 | 38 | 37 |

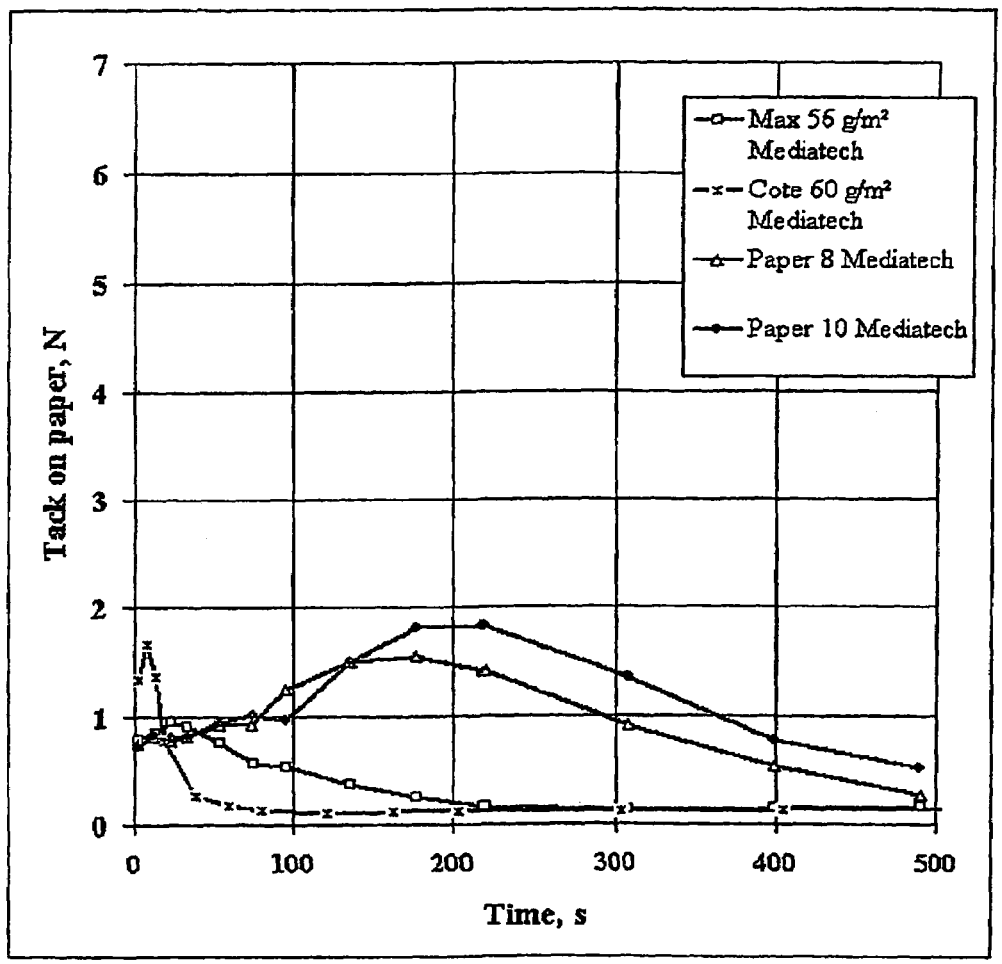
FIG. 5. Legends and corresponding papers: Max = UPM Max 56 g/m², Cote = UPM Cote 60 g/m², Paper 8 = coating colour 5 / sample 8, Paper 10 = coating colour 6 / sample 10.
| ISIT set-up | | | |
|---|---|---|---|
| Printing speed (m/s): | 0.5 | Ink: | Sicpa MediatechUltra Fast |
| Contact hold time (s): | 0.5 | Ink amount (g/m²): | 1.5 |
| Contact force (-): | 8 | | |
| Pull-off speed (-): | 5 | | |
| | Max 56 g/m² | Cote 60 g/m² | Paper 8 | Paper 10 |
|---|---|---|---|---|
| Tack build-up (s): | 23.3 | 7.5 | 177.0 | 217.6 |
| Maximum tack (N): | 1.0 | 1.7 | 1.5 | 1.8 |
| Tack decay (s): | 154 | 53 | 313 | 272 |

FIG. 6. Legends and corresponding papers: Art = UPM Art 100 g/m².
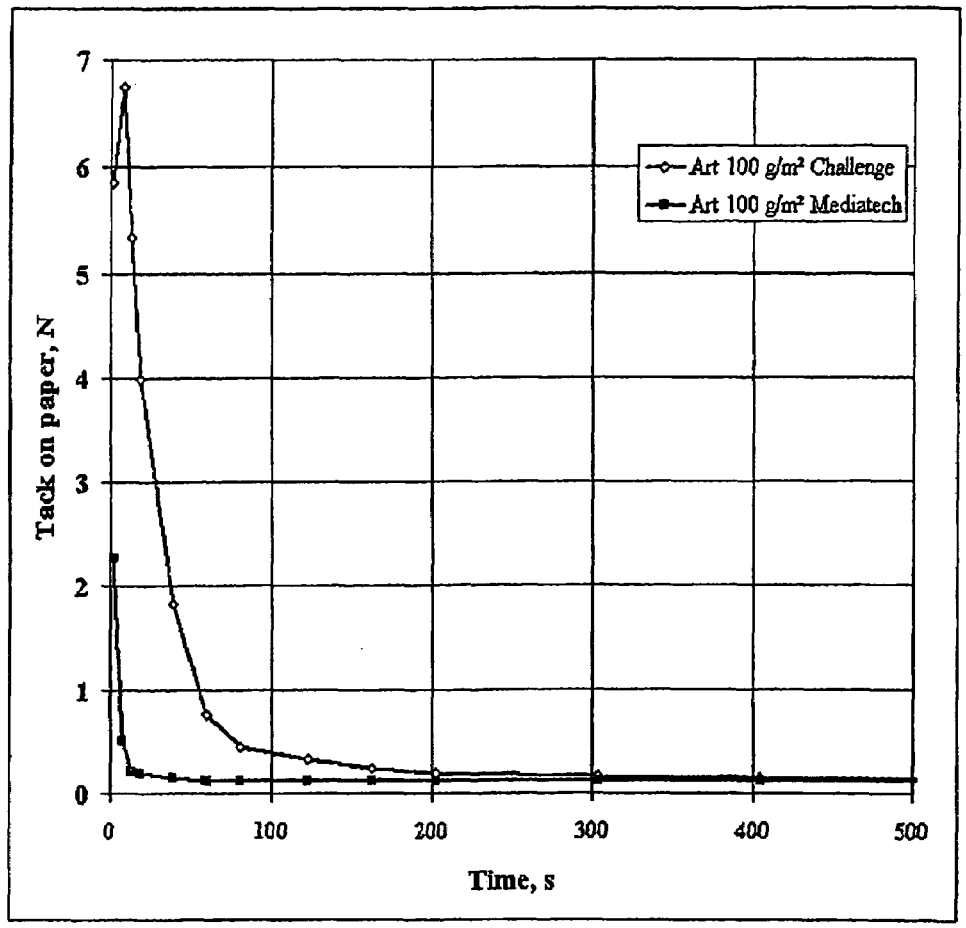
| ISTT set-up | | Ink | Sun Challenge |
|---|---|---|---|
| Printing speed (m/s): | 0.5 | Ink: | Sicpa Mediatech Ultra Fst |
| Contact hold time (s): | 0.5 | Ink amount (g/m2): | 1.4 Sun Challenge |
| Contact force (-): | 8 | | 1.5 Sicpa Mediatecky Ultra Fast |
| Pull-off speed (-): | 5 | | |
| | Art 100 g/m² Challenge | Art 100 g/m² Mediatech |
|---|---|---|
| Tack build-up (s): | 7.7 | 1.9 |
| Maximum tack (N): | 6.8 | 2.3 |
| Tack decay (s): | 73 | 17 |

PRINTED SUBSTRATE AND PRINTING METHOD

RELATED APPLICATIONS

The present application is a continuation of International Application No. PCT/EP2002/007130, filed Jun. 27, 2002.

FIELD OF THE INVENTION

The invention consists of a printed substrate that is a surface treated paper used is heatset offset printing. The invention also covers a printing method where the surface treated printed substrate is printed in the heatset offset printing method. The invented printed substrate can also be printed in gravure printing method.

BACKGROUND

Papers with appropriate surface properties are printed in the heatset offset method. In this printing method the printed item is transferred from the printing plate through an offset blanket onto the paper that is fed into the heatset offset printing machine as a continuous web. The transfer of the print item with ink consisting various degrees of pigment, binder, solvent and additives in the offset method is based on ink transfer from the smooth offset blanket. The ink has been transferred to the blanket from the printing plate where the ink has adhered on the oleophilic areas after the hydrophilic areas of the printing plate have been wetted by the fountain solution. Fountain solution consists of treated tap water, puffer, wetting agents and other additives. A printing plate working with dry offset (also called waterless offset) principal can also be used. In dry offset there is a silicon layer over the printing plate that repels the ink from adhering on the non-image areas of the printing plate. After the printed item has been transferred on the paper the ink will be dried with the help of heated air in order to evaporate most of the solvent from the ink. At the same time also the fountain solution transferred from the offset blanket and most of the moisture of the paper is evaporated. After the dryer the paper web is cooled in chill rolls where after the ink film is hardened and the printed paper web can be handled further.

Certain paper properties are required for a paper used in the heatset offset printing method. A paper with appropriate properties for this printing method is known for example from the European patent 539271 and the publication GB2047568. For these papers it is characteristic that calcium carbonate $CaCO_3$ pigment is used to optimize the porosity of the paper. The printing method itself has been described for example in the German patent publication DE 3207463.

In the earlier technique printing papers have been developed based on the fact that paper has to be porous to some degree so that it can absorb the fountain solution transferred from the offset blanket onto the paper and to make easier the removal of the moisture from the paper as the ink is dried in the dryer.

SUMMARY

The target of the invention is to introduce a new type of a printed substrate that has a surface structure suitable for the heatset offset printing method. To fulfill the demands for a printed substrate the printed substrate is mainly known from the characteristics that have been presented in the patent claims.

The target of this invention is also to present a heatset offset printing method in which the paper is fed as a continuous web into one or several printing units of the printing machine for ink transfer onto the paper after which most of the ink solvent is evaporated in the dryer with heated air in order to dry the ink and to present an ink that is easy to dry in the dryer.

BRIEF DESCRIPTION OF THE DRAWINGS

FIG. 1 is an ISIT Tack Build-Up Curve.

FIG. 2 illustrates Tack Build-up curves and ISIT Tack Build-Up times.

FIG. 3 illustrates Tack Build-up curves and ISIT Tack Build-Up times with Sun Challenge ink.

FIG. 4 illustrates Tack Build-up curves and ISIT Tack Build-Up times with SICPA Mediatech ink.

FIG. 5 illustrates Tack Build-up curves and ISIT Tack Build-Up times with SICPA Mediatech Ultra Fast ink.

FIG. 6 illustrates Tack Build-up curves and ISIT Tack Build-Up times with Sun Challenge an with SICPA Mediatech Ultra Fast ink.

DETAILED DESCRIPTION

The surface of the substrate is non-porous and oleophilic. By this definition it is meant that the oil displaces the fountain solution on the paper surface. The surface properties have been achieved by suitable paper treatment, especially by coating and finishing thereafter. In order to avoid problems related to ink transfer and drying the printed substrate differs from the printing papers used in the heatset offset printing method nowadays as the surface of present papers is porous and water absorbing. The invented printed substrate makes it possible to dry the ink as a surface phenomenon. The printing ink used also differs from the normal inks used today in the heatset offset method because the solvent of the ink evaporates faster in lower air temperatures in the dryer (lower solvent content and/or oil boiling in low temperature and a low solvent retention to the ink binder enabling fast solvent removal) which makes it an easier drying ink. The non-porous surface of the paper allows the use of an easily drying and a fast setting ink (no problems related to fast ink setting, see ink setting definition in clause 3.1). The combination of a non-porous paper surface and an easily drying ink makes it possible to use lower air temperatures in the dryer white at the same the paper moisture content remains high and the ink solvent evaporates. Also the surface properties decrease the amount of fountain solution transferred on the paper (oleophilic non-porous surface repels the fountain solution and prevents it's penetration into the paper structure).

The printed substrate described in the patent makes it possible to optimise the fountain solution used in the heatset offset printing process so that the wetting agent of it is favourably a non-alcohol type.

The invention provides an essential print quality improvement which is based on the fact that drying can be performed with web end temperatures lower than 100° C. measured from the web right after the dryer. With this low drying temperatures on one hand fast moisture removal is prevented and on the other hand the moisture content after drying is higher than in conventional solutions. This is advantageous as fast moisture removal causes fiber roughening and waviness that decrease print gloss and uniformity. The benefits from higher paper moisture content after drying are improved print quality and performance in folding unit after drying. Further, the folding performance is improved because paper stands folding better with higher moisture content and cracking potential is decreased. The higher moisture content also decreases the static electricity that is beneficial for finishing process. It is also easier for the printer to handle unprinted paper, as no wrapping paper is needed because the paper moisture content is near the balance with air moisture content.

The benefits of the invention for paper makers are increased moisture content, lower strength demand and improved production efficiency. The moisture content can be higher because the paper moisture is not evaporated in drying and the heatset offset problem blistering does not occur. As there is no risk for blistering paper strength can be lowered which enables the possibility of using lower prize furnish for base paper and decreasing the need for sizing the paper. Decreasing sizing makes it possible to increase the production speed due to better water removal. Using the invented printing substrate with a recipe suitable also for gravure printing method it is possible to cut the finished paper machine rolls at the same time for gravure and heatset offset printing methods for high quality printing and thus decrease the waste paper amount and improve production efficiency.

The non-porous paper improves paper runnability and printability. As the paper does not absorb fountain solution from printing units no changes in paper dimensions take place and problems like miss register or fan-out do not occur. There is no ink setting as there are no pores in the printing substrate. There fore problems related to ink setting like back-trap mottling, back-trap picking or carry-over piling do not occur. This improves the print result and makes longer print runs possible because of less printing blanket washing needed.

The new printing concept is environmentally friendly because the fountain solution used in non-alcohol type reducing the VOC emissions and lower energy needed in drying due to low air temperature in the drying process. The ink solvent content of the print is low.

The printed substrate invented covers the following conditions:

1) The IGT Ink Set-off value at 30 s delay time is bigger than 0.60 and
2) Gurley-Hill Air Permeance Test value is bigger than 5000 s/100 ml. The Set-off value is a measure for capillary suction of paper surface. The result of the IGT measurement gives a value for ink setting speed that correlates with the paper surface porosity. Gurley-Hill value is a measure for porosity.
3) The Tack-Build-up time of the ISIT measurement is advantageously more than 100 seconds with a printing ink that has stability in the Tack-O-Scope ink tack measurement $T_{max}$ 270-300 seconds. This stability result can be reached with for example with a know Sun Challenge ink. The result of the ISIT measurement gives a value for ink setting speed that correlates with the paper surface porosity.

The printed substrate is advantageously a coated paper or surface treated paper or board that contains plate like pigments as coating pigment. The surface properties of paper can be further adjusted by the choice of coating pigment and latex (coating binder) types and their amounts. The aspect ratio of the plate like pigment particle that is the relation of the pigments diameter to the thickness of the pigment particle is more than 2 and advantageously more than 4. The aspect ratio is advantageously bigger than 4 to achieve a non-porous surface. The pigment used in the coating colour is therefore advantageously talc as a sole pigment or a combination of kaolin and talc pigments. The high aspect ratio of the plate like talc is advantageously more than 25 and affects positively in decreasing the porosity of the paper surface. It the same way the softer the latex used is (low $T_g$ value, $T_g$ is the glass transforming temperature) and the more latex used in relation to the amount of pigment is the more closed (non-porous) the surface is. Also the cross-linking of the latex binder improves closeness of the surface.

The invention is described more detailed in the following part by referring to some examples that do not restrict the use of the invention.

EXAMPLES

Example 1

The base paper in the invented paper was a typical LWC base paper with an ash content of 12% and a fibre mix of 40% chemical pulp and 60% of mechanical (TMP) pulp. The basis weight was approximately 36 g/m² and the density approximately 660 kg/m³. The paper was coated with a coating receipt of following components:

| | |
|---|---|
| Talc (C10XO or C15) | pigment |
| Kaolin (Supragloss95) | pigment |
| Styrene Butadiene latex (Rhodopas 388) | latex binder |
| Starch (Raisamyl 302) | binder |
| Styrene maleic anhydride (Raisaprint D100 or D200) | adjustment of surface chemical properties |
| Calcium stearate (Raisacoat 50) | add agent for calendering |
| Optiblank NF | optical brightener |
| Glyoxal | cross-linker |

The solid content of the coating colour was 58% and the pH 7.5. The $T_g$ value of Rhodopas 288 was 0° C. that is a lower $T_g$ value than with latexes normally used in coating colours for heatset offset method. The surface closeness can be improved with a $T_g$ value lower than 5° C.

Various coating colour recipes for the invented paper are presented in the table 1 (as parts of weight).

TABLE 1

Coating colour recipes

| | Coating colours | | | | | | |
|---|---|---|---|---|---|---|---|
| | 1 | 2 | 3 | 4 | 5 | 6 | 8 |
| C10XO | 70 | 70 | | | 40 | 70 | 70 |
| C15 | | | 70 | 100 | | | |
| Supragloss | 30 | 30 | 30 | | 60 | 30 | 30 |
| Rhodopas SB 388 | 10 | 15 | 10 | 10 | 10 | 10 | 10 |
| Raisamyl 302 | 2 | 3 | 3 | 3 | 3 | 3 | 3 |
| D200 | | 3 | 3 | 3 | 3 | 3 | |
| D100 | 1 | | | | | | |
| Raisacote 50 | 0.5 | 0.5 | 0.5 | 0.5 | 0.5 | 0.5 | 0.5 |
| Optiblanc | 0.2 | 0.2 | 0.2 | 0.2 | 0.2 | 0.2 | 0.2 |
| Glyoxal | 0.2 | 0.2 | 0.2 | 0.2 | 0.2 | 0.2 | 0.2 |

*D100 was boiled together with the starch.

The paper was coated with the blade coating (Opticoat-Jet). The upper (rougher) side of the 36 g/m² base paper was coated first. The target amount of coat weight was 12 g/m² on both sides of the paper (12+12 g/m² coating) and the final coated paper grammage was 60 g/m². The target final moisture content was 5.3% before calendering.

The web was dried after coating with infrared dryers and airborne web-dryers.

The coated paper was reeled into rolls. The rolls were supercalendered so that the upper side was against the first chilled roll. The conditions in supercalendering were as follows:

| Temperature | |
|---|---|
| upper: | 120° C. |
| middle: | 110° C. |
| bottom: | 90° C. |
| Nip load | 320 kN/m |
| Speed | 500 m/min |
| Nip amount | 9 |

The properties of the final the two-side coated papers are listed in table 2. The numbers refer to the number of the coating colours and corresponding sample number.

TABLE 2

Properties of final coated papers

| | | Coating colour/sample | | | | | |
|---|---|---|---|---|---|---|---|
| | Unit | 1/2 | 5/8 | 6/10 | 3/12 | 8/18 | 4/22 |
| Physical properties | | | | | | | |
| Basis weight | g/m$^2$ | 59.8 | 61.7 | 61.7 | 62.7 | 62.7 | 63.7 |
| Amount of coating colour | g/m$^2$ | 9.7 | 12.0 | 13.1 | 12.6 | 12.8 | 12.7 |
| Thickness | mμ | 48 | 49 | 49 | 48 | 48 | 48 |
| Density | kg/m$^3$ | 1239 | 1262 | 1265 | 1298 | 1302 | 1319 |
| Bulk | dm$^3$/kg | 0.81 | 0.79 | 0.78 | 0.77 | 0.77 | 0.76 |
| Surface properties | | | | | | | |
| Roughness PPS 10 ts*) | mμ | 0.96 | 1.05 | 1.04 | 1.07 | 0.93 | 1.10 |
| Roughness PPS 10 ws**) | □m | 0.99 | 1.01 | 0.91 | 0.91 | 0.73 | 1.10 |
| Gloss ts*) | % | 63.0 | 65.7 | 63.3 | 59.4 | 65.2 | 49.1 |
| Gloss ws**) | % | 58.6 | 67.2 | 64.5 | 59.3 | 65.0 | 48.6 |
| Optical properties | | | | | | | |
| Brightness Elrepho ws**) | % | 74.5 | 73.3 | 73.4 | 71.7 | 73.6 | 72.9 |
| Luminance ws**) | % | 78.0 | 77.6 | 77.2 | 76.2 | 77.1 | 76.4 |
| Opacity ws**) | % | 91.3 | 91.0 | 91.0 | 90.2 | 91.5 | 89.6 |
| Dominant wave length ws**) | nm | 573 | 574 | 573 | 574 | 573 | 573 |
| Excitation purity ws**) | % | 3.2 | 3.9 | 3.5 | 4.2 | 3.4 | 3.4 |
| Porosity and absorption Properties | | | | | | | |
| NP ink absorption ws**) | | 27.3 | 17.4 | 18.4 | 18.1 | 20.1 | 27.3 |
| K&N ink absorption ws**) | | 2.7 | 1.3 | 1.3 | 1.5 | 1.5 | 3.4 |
| Printability properties | | | | | | | |
| IGT surface strength ws) | m/s | 0.50 | 0.60 | 0.66 | 0.65 | 0.65 | 0.58 |
| IGT surface strength wsrd***) | m/s | 0.53 | 0.63 | 0.75 | 0.78 | 0.78 | 0.68 |
| IGT surface strength wsard****) | m/s | 0.48 | 0.58 | 0.58 | 0.53 | 0.53 | 0.48 |

*ts = top side
**ws = wire side
***wsrd = wire side measured in running direction
***wsard = wire side measured against running direction The small number in the K&N ink absorption test (in each case under 4%) already shows that the surfaces of the papers in question are very closed and non-absorbing.

The following commercial and known heatset offset papers were used in the comparison test:

| | |
|---|---|
| SCO | UPM Max 56 g/m$^2$ |
| LWCO | UPM Cote 60 g/m$^2$ |
| LWCO | UPM Ultra 70 g/m$^2$ |
| LWCO | UPM Ultra M 70 g/m$^2$ |
| MWC | UPM Star 100 g/m$^2$ |
| WFC | UPM Art 100 g/m$^2$ |

SCO is a supercalendered paper for heatset offset, LWCO is a light weight coated paper for heatset offset printing method, MWC is a medium weight coated paper for heatset offset and WFC is a wood free coated paper used in heatset offset method. The properties of the known papers have been analysed with following methods.

The closed surface is also suitable in heatset offset method and in gravure printing method for different kinds of papers and boards.

Example 2

The significance of a test method is its ability to characterize the surface porosity of the paper independent of paper bulk or thickness or surface roughness. Absorption methods suit best to characterize the paper surface as absorbance and porosity depend on each other. Set-off at 30 seconds delay time with IGT Printability Tester, ISIT Tack Build-up Method and K&N Ink Absorption Tests are based on capillary absorption and paper bulk effect is eliminated. The surface roughness affects the K&N result and therefore these results are guiding. Gurley-Hill Air Permeance measures the paper porosity. Gurley-Hill Air Permeance values are used together with IGT Set-off at 30 s delay time values in order to separate uncoated porous papers from the invented closed surface coated papers.

3.1 Set-off at 30 s Delay Time, Ink Requirement and Print Gloss with IGT-type Printability Tester Set-off is a measure of the speed of ink setting on paper. In ink setting the ink film on paper hardens as the capillary forces caused by paper surface porosity absorb the solvent component of offset ink. Ink setting speed is high for micro porous paper coating surfaces and low for closed non-porous paper surfaces and also for uncoated papers that contain larger size pores that cannot form high capillary forces.

Ink requirement is a measure for the amount of ink needed for certain optical print density. Print density is the ability of printed image to absorb and reflect light and it correlates with the colour strength or darkness of colour seen by the human eye. Lower ink requirement is advantageous for good print quality.

Ink gloss is a measure for the print quality. High print densities can only be reached with a high print gloss.

3.1.1 Introduction

This method describes the procedure to be adopted when using an IGT-type printability tester to prepare prints on paper. IGT Printability Testers are manufactured by the IGT Testing Systems b.v., Amsterdam Netherlands. The following properties of printed paper are measured in this method:

a) Set-off at 30 s delay time that correlates with ink setting speed and surface porosity
b) Ink requirement which means the amount of ink needed for certain print density (see Clause 3.1)
c) Print gloss which is the ink gloss measured at certain ink amount Warning—Precaution shall be taken when making a comparison between printing results from different laboratories or from different printability testers, see Clause 10

3.1.2 References

The following Scandinavian SCAN-methods made by the Scan Test Secretariat are referred in this method:

SCAN-G 1 Pulps, papers and boards—Reflectance factor—General procedure of measurement (ISO 2469)
SCAN-P 2 Papers and boards Conditioning of test samples (EN 20187, ISO 187)
SCAN-P 8 Papers and boards Opacity and Y-value, light scattering and light absorption (C/2°) coefficients (ISO 2471)
SCAN-P 9 Papers and boards Identification of machine and cross directions
SCAN-P 10 Papers and boards—Identification of wire side
SCAN-P 36 Papers and boards—Evaluation of test prints

3.1.3 Definitions

For the purpose of this method the following definitions apply:

3.1.3.1 Print density, D The logarithm to base 10 of the ratio of the Y-value of the unprinted paper to the luminous reflectance factor of the print when it is placed over a pad of the unprinted paper.

3.1.3.2 Set off at 30 s delay time A measure of the tendency for ink from a newly printed surface to be transferred to another surface with which the print is brought into contact under the action of a normal force without shear. The set-off is evaluated as the logarithm to base 10 of the ratio of the Y-value of the recipient surface to the luminous reflectance factor of the area stained by ink transfer when the stained paper is placed over a pad of the recipient paper. The set-off delay time is 30 s from ink transfer to set-off contact. The Set-off at 30 s delay time is given in print density units.

Note The recipient paper may be a standard paper or a sheet of the paper being tested. Other print quality definitions are given in SCAN-P 36.

3.1.4 Principle

A cylindrical printing form consisting of a disc covered with plastic coated rubber is inked in an inking unit. The paper or board to be printed is mounted on a cylindrical sector. Printing takes place under standard conditions.

The amount of ink transferred to the paper is calculated by weighing the printing disc before and after printing.

When set-off is determined, the fresh print is brought into contact with a clean recipient paper in a second printing nip under normal pressure without shear 30 s after the printing.

3.1.5 Apparatus 3.1.5.1 Printability tester consisting of a printing unit with two adjustable printing nips.

3.1.5.1.1 Printing unit incorporates a motor-driven sector which rotates with constant and adjustable speed against a printing disc and when measuring set-off, also against a second disc. The force between the printing disc and the sector is achieved by means of an adjustable spring. It is also possible to adjust the delay time used for set-off purposes.

Note 1—It is important that the instrument is properly calibrated. The manufacturer of the apparatus supplies accessories for the calibration of both speed and force.

3.1.5.1.2 Cylindrical printing disc of aluminium, 68 mm in diameter and 32 or 50 mm wide, covered with plastic coated rubber (to avoid absorption of ink vehicles) that has the hardness of about 85° Shore A. The width of the disc must match that of the sector. The disc must be light enough to be weighed on an analytical balance with a precision of 0.1 mg.

Note 2—The rubber deteriorates with use and time, and the discs should be kept in the dark at room temperature.

3.1.5.2 Inking unit to give a uniform ink film on the printing disc.

3.1.5.3 Analytical balance with an accuracy of at least 0.1 mg.

3.1.5.4 Ink pipette, or other suitable device for transferring an appropriate amount of ink to the inking device.

3.1.5.5 Printing ink. Standard lithographic offset ink manufactured by Michael Huber, Munich Germany, is used. The trade name of the ink is in German "Wegschlagtestfarbe" and in English "Setting Test Ink", ink number 520068, the batch number in test was 00122615.

Note 3 Due to the fact that ink is made out of natural raw materials it is impossible to have exactly constant ink properties from batch to batch. Therefore the results of the tests also may vary and a correction to the test conditions are needed accordingly, see clause 10.2.

3.1.5.6 Solvent for cleaning purposes. Petroleum ether alone or white spirit followed by petroleum ether is suitable.

Note 4 Cleaning liquids containing surfactants or non-volatile components should not be used.

3.1.5.7 Set-off paper. A cast-coated paper "New Ojo" used in the method is manufactured by Oji Paper from Japan and is available through their agents.

3.1.6 Sampling and Preparation of Test

The sampling procedure is not covered in this method. Make sure that the test pieces taken are representative of the sample received. Condition the samples as indicated in SCAN-P 2 and keep them in the conditioned atmosphere throughout the test.

Note 1 Because the viscosity of the ink is temperature dependent, temperature control is as important for this test as humidity control.

Cut the test samples to the dimensions suitable for the printability tester. Normally, the test-pieces strips should be cut in the machine direction (see SCAN-P 9) to simulate web offset printing. The direction of printing must be stated in the report. The pieces should be free from folds and wrinkles. Mark the side to be printed.

Note 2 For subsequent evaluation according to SCAN-P 36, at least five strips are required.

3.1.7 Procedure

3.1.7.1 Test Conditions

3.1.7.1.1 Temperature
If the equipment has an internal temperature controller, make sure that the testing equipment, inking unit and printing disc and the test material are maintained at the correct temperature (23±0.5° C.).

3.1.7.1.2 Printing disc
Select a disc with a plastic coated rubber surface which match the width of the sector (3.1.5.1.3). Use the same kind of discs in set-off contact as in printing.

3.1.7.1.3 Inking the printing disc
Introduce ink into the inking unit and ink the printing disc in accordance with the manufacturer's instructions.

3.1.7.1.4 Printing pressure
Set the printing force to 650 N for the 50 mm wide printing disc and to 415 N for the 32 mm wide printing disc to give a line load of (13±1) kN/m. If set-off is to be measured, use the same line load in the second printing nip.

3.1.7.1.5 Printing speed
Adjust the printing speed to 1.0 m/s.

Note If there is a risk for picking the following procedure is used. Attach a piece of plastic tape to the areas on the paper where the cylinder stops against the printing disc during printing, because in those places the risk of picking is the greatest. This must be stated in the report.

3.1.7.1.6 Delay time
The delay time between ink transfer and set-off is 30 s.

3.1.7.2 Test procedure
Fasten the front end of the test piece to the sector. Adjust the test piece so that it is flat on the sector and fasten the other end of the test sample. Fasten a strip of set-off paper on the second printing disc and mount the disc to the second shaft. Weigh the inked printing disc and place it in position on the shaft. Bring the printing disc into contact with the sector and print the test piece. Remove the printing disc and weigh it immediately. After ink transfer the print is pressed against the cast-coated set-off paper after a delay time of 30 s. Save the printed test sample and the cast-coated set-off papers for optical measurement (24±2) hours later. The strips must be saved for later measurement according to SCAN-P 36.

Print a total of four test pieces with four different ink quantities. Print first with the lowest ink quantity and increase stepwise so that new ink is continually applied to the inking unit. Clean the printing disc after each printing. Clean the inking unit after each test series, i.e. after four printings.

Note 2 After cleaning the printing disc with solvent, wipe the surface dry and give the solvent sufficient time to evaporate.

Choose the four ink quantities so that they cover a range of ink on paper from 0.7 g/m² to at least 2.0 g/m². The print properties are evaluated by determining the print density in an instrument conforming to the requirements of SCAN-G 1 (see SCAN-P 36).

3.1.8 Calculations

3.1.8.1 Determination of Ink Amount on Paper

Calculate the mass per unit area of ink transferred to each test piece according to:

$$W = \frac{(G1 - G2)}{A}$$

where
W is the ink transferred, in grams per square meter;
G1 is the mass of the printing disc before printing, in grams to the nearest 0.1 gram;
G2 is the mass of the printing disc after printing, in grams to the nearest 0.1 gram;
A is the area of the print, in square meter, the area of the print is the same as the surface area of the printing disc

3.1.8.2 Determination of Ink Requirement

The results are drawn in a diagram where the X-axis is the amount of ink on paper and Y-axis is the print density of the printed paper. A curve is drawn with the four ink amounts and corresponding print densities. The Ink requirement is interpolated from the curve at the point when ink amount on paper is 1.50.

3.1.8.3 Determination if Set-off at 30 s Delay Time

The results are drawn in a diagram where the X-axis is the amount of ink on paper and Y-axis is the set-off print density of the cast-coated set-off paper. A curve is drawn with the four ink amounts and corresponding set-off print densities measured from the cast coated paper. The Set-off at 30 s delay time is interpolated from the curve at the point when ink amount is 1.50 g/m².

3.1.8.4 Determination of Print Gloss

The results are drawn in a diagram where the X-axis is the amount of ink on paper and Y-axis is the print gloss of the sample. A curve is drawn with the four print densities and corresponding print gloss values. The Print gloss is interpolated from the curve at the point when ink amount is 1.50 g/m².

3.1.9 Report

The test report shall include reference to this SCAN-test Method and the following particulars:

(a) Time and place of testing;
(b) Identification of the test material
(c) Make and type of printing press;
(d) Type and name of printing ink used including the manufacturer and the batch number;
(e) The amount of ink per unit area transferred to each test piece, to the nearest 0.01 g/m²;
(f) The type and grammage of the set-off paper used;
(g) The delay time before set-off
(h) For each test piece, the time at which the printing was made.
(i) Any departure from this method, which may have affected the results.

3.1.10 Reproducibility

The properties of the Setting Test Ink 520068 may change from batch to batch. In order to have comparable results between laboratories and ink batches the following correction should made to the test conditions.

Use the same coated paper and Setting Test Ink of batch 00122615 and Setting Test Ink of the new batch. Print the paper with the inks according to the test method with the both inks. If the Set-off values for the two inks differ then change the delay time from ink transfer to set-off contact so that Set-off at 30 s delay time value is the same for both inks at the accuracy of ±0.03 print density units. If the Set-off value of the new batch is higher than the reference batch then increase the 30 s delay time from ink transfer to set-off contact and if the Set-off value is lower then decrease the delay time.

Note—All changes in test printing conditions must be reported.

3.2 ISIT Tack-Build-Up Method

3.2.1 Principle

The papers were tested with the ISIT method that gives the Ink Tack Build-up time that correlates with the ink setting speed. Ink tack describes the force needed to split an ink film. The value is achieved with Ink/surface Interaction Tester ISIT device ("ISIT device"), manufactured by SeGam Ltd, UK. First a controlled ink amount is transferred onto the tested paper and after a specified time the ink tack is measured. The speed of ink tack increase after ink transfer correlates with the ink setting speed that depends on the surface pore structure. Ink setting speed is slow with non-porous surfaces and fast with micro porous paper coatings.

A commercial IGT inking unit and IGT printing disc ate used for preparation and transfer of ink. The procedures in ink transfer are similar as in IGT Set-off at 30 s delay time method (see Clause 3.1.7). Ink tack on paper is measured with a special attachment that consists of a solenoid, a coil spring a load cell and a contact disc. The contact disc is pressed against the ink on paper by electromagnetic force. The contact disc is separated from the print (ink on paper) by the strain force of the extended coil spring. The strain gauge, fixed between the contact disc and the coil spring, generates a load-dependant signal that is recorded as the measured tack force. After the measurement the contact disc and print change places so that the next contact with the disc and ink on paper happens between clean contact disc and untouched ink surface. The build-up of the tensile force required to split the ink layer is measured automatically so that the contact disc has successive separations from the print and each individual separation is recorded.

3.2.2 Tack Build-up Time

The result of the test is a function of ink tack (Y-axis Tack-on-paper) vs. ink setting time (x-axis Time) and the Tack Build-up time (s) is the time from the moment of ink transfer onto paper to the time when the maximum tack value is reached, see picture 1. In practice the tack value is the force needed to separate the contact disc from the ink layer that is on the printed substrate. This method can be used to separate different paper surface properties when using the same printing ink but different papers. The longer the time for the maximum tack with the same ink the more non-porous (closed) the surface is. Picture 1.

3.2.1 Test Conditions in the ISIT Tack Build-up Method

The conditions in the ISIT Tack Build-up method were following:

| | |
|---|---|
| Applied ink amount | 100 mm³ |
| Transferred ink amount | 1.4 g/m² Sun Challenge |
| | 1.5 g/m² Sicpa Mediatech Ultra Fast |
| Ink leveling time | 5 s in the rollers + 5 s with the disc |
| Ink leveling speed | 0.7 m/s |
| | One printing and the washing of the rollers |
| Ink transfer, pressure | 15 kN/m |
| Printing disc | 20 mm, rubber surface |
| Time with the contact disc | 0.5 s |
| Pressure with contact disc | 8 (no dimension) |
| Separation speed of contact disc | 5 (no dimension) |
| Time intervals between printing and contact | 1.9 s, 7.6 s, 13.3 s, 19.0 s, 39.6 s, 60.3 s, 80.9 s, 121.6 s, 162.3 s, 203.0 s, 303.6 s. 404.2 s, 504.8 s |

3.4 K&N Ink Absorption Test

The papers were tested with the K&N ink absorption test. The method description is here:
Ink Absorption with the K&N Ink 3.4.1 Principle The test ink is spread on the paper for a specific time. The density of the colour is a measure to the absorption ability of the paper. The reflectance value is measured.

3.4.2 General

First a test ink layer covering the paper surface is spread on the paper. The part of the ink that has not been absorbed into the paper will be removed and the reflectance value of the inked paper is measured with an Elrepho colour measurement device. The absorption properties of the both sides of the paper are measured separately, 2 tests per side. The test ink is spread on the side that is tested.

3.4.3 K&N Ink

K&N ink is used mostly with coated paper grades (ink absorption time 2 min).

The sample is cutted into 4 slices of size 8×25 cm so that the longer side is in machine direction.

The tested paper slice is mounted on a glass plate so that two of the slices are upper side of the paper up and two bottom of side of the paper up.

Ink is spread on the paper over an area of about 5×8 cm size and the rest of the test paper is left clean. It is recommended to use a protection paper over the clean area of the test paper.

The K&N ink is carefully mixed in the can. An ink layer that covers the paper surface is spread on the paper and the timer is switched immediately on.

The ink absorption takes place for 2 min where after the excessive ink on the paper surface is wiped away first with a trowel and thereafter with a cloth. The wiping is continued until there is no change in the lightness of the inked area, normally 5-6 times.

The amount of ink should as high enough so that it is not possible that all the ink is absorbed into the paper.

The tested papers are moved to hanging in a line so that there is no obstacle for ink drying. The reflectance measurement will be done after 2 hours. The time for measurement is written down.

3.4.4 Settings of the Colour Measurement

The power is switched on.

A lamp warming time of 5 min is needed before the measurement can start.

Check that the gray filter is on: the sign on the lid is visible.

Measurement of the reflectance value.

Zero the gauge.

The filter switch is on position 12.

The indicator is adjusted to show zero with the zero potentiometer. The adjustment button is pushed down and the zero point is adjusted again.

Filter 10 is switched on with the filter selector.

The inner standard is moved away.

The gauge is adjusted to show 100 on the clean area of the test print.

A pile of tested paper is placed on the carrier plate where the paper on top is the inked paper. The pile of paper and tested papers are always on the same side.

The clean area of test paper is mounted under the measuring opening and the value 100 is adjusted to measuring drum.

The gauge is first adjusted to zero only by turning the measuring drum and thereafter again with adjustment button.

Measurement of the Reflectance Value of the Inked Area

The inked area of the test slice is moved under the measuring opening.

The indicator is adjusted first to show zero only by turning the measuring drum and thereafter again with the adjustment button.

The reflectance value in directly the number on the measuring drum. The reading is taken with the accuracy of 0.1 unit. The reflectance value of each test paper is measured in the same manner. One measurement is done form the test paper.

3.4.5 Calculation of the Result

K&N value=100.0%−the measured reflectance value, %

3.5 Gurley-Hill Air Permeance Test

Gurley-Hill value is measured according to standard T536 om-88. A high value means that the paper is non-porous as a long time is needed for 100 ml gas to penetrate through the paper.

Example 3

This ink can be characterized best in relation to the paper porosity with the stability value that is received from the Tack-O-Scope tack measurement that is a known method in printing ink industry. In the Tack-O-Scope measurement the ink tack that is a measure for the force needed to split an ink layer increases from starting moment as the solvent of the ink starts to evaporate until it reaches a maximum value where after the tack decreases as the ink starts to dry. For a fast drying ink that is favorable for the invented heatset offset printing method the $T_{max}$ value is low.

The measuring conditions in the Tack-O-Scope test were as follows:

| | |
|---|---|
| ink amount | 0.4 g |
| stabilizing time | 30 s |
| stabilizing speed | 100 m/min |
| testing speed | 200 m/min |
| temperature | 25° C. |

Example 4

The results refer to coating colour and sample numbers that are explained in clause 2 Papers.

5.1 Set-off at 30 s Delay Time, Ink Requirement and Print Gloss with IGT-type Printability Tester The results from IGT Set-off at 30 s delay time are in table 3.

TABLE 3

IGT set-off at 30 s delay time, Ink requirement and Print gloss

| | Measurement | On paper Ink Amount g/m2 | Print gloss % | Print density | Set-off density 30 s delay | Paper gloss % | On disc Ink amount g/m2 | set-off % 30 s % | Ink transfer % |
|---|---|---|---|---|---|---|---|---|---|
| Coating colour 5 | 1 | 0.78 | 62.7 | 1.02 | 0.32 | 63.1 | 1.38 | 31.0 | 56.8 |
| Sample 8 | 2 | 1.10 | 72.4 | 1.31 | 0.60 | 70.5 | 2.12 | 45.6 | 51.9 |
| | 3 | 1.51 | 77.1 | 1.52 | 0.87 | 70.9 | 2.86 | 57.5 | 52.6 |
| | 4 | 2.09 | 80.3 | 1.75 | 1.11 | 68.5 | 4.01 | 63.6 | 52.2 |
| | Interpolation | 1.50 | 74.8 | 1.47 | 0.80 | 68.3 | 2.83 | 52.6 | 52.98 |
| Coating colour 6 | 1 | 0.79 | 62.1 | 0.99 | 0.33 | 60.7 | 1.29 | 33.3 | 61.2 |
| Sample 10 | 2 | 0.96 | 70.2 | 1.15 | 0.53 | 68.4 | 1.83 | 45.7 | 52.5 |
| | 3 | 1.40 | 79.1 | 1.47 | 0.83 | 66.8 | 2.72 | 56.3 | 51.5 |
| | 4 | 2.10 | 78.7 | 1.72 | 1.15 | 65.6 | 4.06 | 66.9 | 51.9 |
| | Interpolation | 1.50 | 74.7 | 1.41 | 0.82 | 64.5 | 2.86 | 55.0 | 53.19 |
| Coating colour 3 | 1 | 0.72 | 63.9 | 0.94 | 0.32 | 61.6 | 1.24 | 33.6 | 58.1 |
| Sample 12 | 2 | 1.07 | 66.2 | 1.21 | 0.51 | 59.6 | 2.04 | 42.1 | 52.4 |
| | 3 | 1.46 | 71.3 | 1.46 | 0.82 | 62.0 | 3.00 | 55.8 | 48.5 |
| | 4 | 2.07 | 75.7 | 1.68 | 1.07 | 59.9 | 4.08 | 63.7 | 50.9 |
| | Interpolation | 1.50 | 70.8 | 1.41 | 0.78 | 60.8 | 2.95 | 52.7 | 51.54 |
| UPM Max | 1 | 0.75 | 47.7 | 0.74 | 0.12 | 50.7 | 1.17 | 16.2 | 64.4 |
| 56 g/m2 | 2 | 1.26 | 50.3 | 1.11 | 0.38 | 50.6 | 2.26 | 34.4 | 55.7 |
| | 3 | 1.58 | 52.9 | 1.26 | 0.52 | 49.3 | 3.06 | 41.1 | 51.6 |
| | 4 | 2.13 | 58.3 | 1.48 | 0.82 | 47.9 | 4.38 | 55.1 | 48.7 |
| | Interpolation | 1.50 | 52.8 | 1.18 | 0.50 | 49.6 | 2.88 | 38.6 | 54.31 |
| UPM Cote | 1 | 0.85 | 59.3 | 1.00 | 0.05 | 65.7 | 1.38 | 4.8 | 61.90 |
| 60 g/m2 | 2 | 1.04 | 60.9 | 1.20 | 0.09 | 65.5 | 1.87 | 7.9 | 55.90 |
| | 3 | 1.62 | 64.8 | 1.49 | 0.25 | 65.9 | 2.84 | 16.9 | 57.00 |
| | 4 | 2.21 | 69.2 | 1.69 | 0.49 | 66.9 | 4.21 | 28.8 | 52.60 |
| | Interpoloitun | 1.50 | 64.1 | 1.38 | 0.24 | 66.0 | 2.72 | 15.8 | 56.50 |
| UPM Ultra | 1 | 0.75 | 66.6 | 0.94 | 0.04 | 68.5 | 1.37 | 4.7 | 55.1 |
| 70 g/m2 | 2 | 1.08 | 67.0 | 1.21 | 0.09 | 69.4 | 1.92 | 7.4 | 56 |
| | 3 | 1.65 | 70.5 | 1.56 | 0.28 | 68.1 | 2.96 | 18.3 | 55.7 |
| | 4 | 2.11 | 73.7 | 1.70 | 0.55 | 68.8 | 3.99 | 32.2 | 53 |
| | Interpolation | 1.50 | 70.0 | 1.41 | 0.28 | 68.7 | 2.76 | 17.7 | 54.77 |
| Upm Star | 1 | 0.79 | 67.8 | 1.05 | 0.02 | 77.7 | 1.27 | 2.1 | 62.2 |
| 100 g/m2 | 2 | 1.16 | 72.2 | 1.33 | 0.07 | 76.9 | 1.91 | 5.3 | 60.4 |
| | 3 | 1.58 | 74.3 | 1.55 | 0.14 | 76.6 | 2.64 | 8.8 | 60 |
| | 4 | 2.15 | 79.1 | 1.71 | 0.37 | 76.3 | 3.97 | 21.8 | 54.3 |
| | Interpolation | 1.50 | 74.0 | 1.45 | 0.17 | 76.9. | 2.61 | 10.6 | 58.78 |
| Upm Art | 1 | 0.82 | 66.6 | 1.06 | 0.01 | 69.4 | 1.18 | 1.1 | 69.5 |
| 100 g/m2 | 2 | 1.19 | 67.8 | 1.32 | 0.02 | 68.9 | 1.89 | 1.8 | 63 |
| | 3 | 1.7 | 71.9 | 1.57 | 0.06 | 69.2 | 2.77 | 4.1 | 61.3 |
| | 4 | 2.48 | 68.8 | 1.7 | 0.13 | 69.5 | 3.93 | 7.7 | 63.3 |
| | Interpolation | 1.50 | 68.7 | 1.41 | 0.05 | 69.3 | 2.36 | 3.5 | 64.39 |

Printing ink: Michael Huber Munchen setting test ink 520068, batch 00122615
Place and time: UPM-Kymmene Rauma Mills, 15.3.2002

Set-off at 30 s delay time values for the invented papers are over 0.80 s, for the known uncoated paper is 0.79 and known coated papers less than 0.40. Ink requirement values (table 3 On paper Ink amount) for the invented papers and known coated papers are over 1.50 and for the known uncoated paper more than 2.00. Print gloss values for the invented papers and MWC and WFC papers are over 70%, for the known uncoated paper under 60%, LWCO papers over 65%. Delta Print Gloss (Print gloss—Paper Gloss from table 3) is over 5% for the invented papers, for the uncoated paper 7.6%, for the LWCO papers less than 3% and for MWC and FWC 0%.

5.2 Gurley-Hill Air Permeance

The results of the Gurley-Hill Air Permeance measurement (G-H) were following:

|  | G-H s/100 ml |
|---|---|
| Paper with the invented properties: | |
| Coating colour 3/sample 12 | 31690 |
| Coating colour 5/sample 8 | 13990 |
| Coating colour 6/sample 10 | 40260 |
| The knows papers | |
| UPM Cote 60 gsm (LWCO) | 3140 |
| UPM Max 56 gsm (SCO) | 360 |
| UPM Star 100 gsm (MWC) | 3430 |
| UPM Ultra 70 gsm (LWCO) | 2370 |
| UPM Art 100 gsm (WFC) | 2240 |

The invented papers have much lower air permeance.

5.3 ISIT Tack-Build-Up

The ISIT Tack Build-up curves and ISIT Tack Build-up times for the three known papers and for one paper invented (coating colours 3/sample 12) with the Sun Challenge ink are presented in picture 2. The ISIT Tack Build-up time for the invented paper is over 400 s as the values for the known papers are less than 50 s.

The ISIT Tack Build-up curves and ISIT Tack Build-up times for two known papers and for two papers invented (coating colours 5/sample 8 and coating colours 6/sample 10) with the Sun Challenge ink are presented in picture 3. The ISIT Tack Build-up times for the invented papers are over 300 s as the value for the known uncoated paper is 136 s and known coated paper less than 25 s.

The ISIT Tack Build-up curves and ISIT Tack Build-up times for the three known papers and for one paper invented (coating colours 3/sample 12) with the SICPA Mediatech Ultra Fast ink are presented in picture 4. The ISIT Tack Build-up time for the invented paper is over 200 s as the values for the known papers are clearly less than 10 s.

The ISIT Tack Build-up curves and ISIT Tack Build-up times for two known papers and for papers invented (coating colours 5/sample 8 and coating colours 6/sample 10) with SICPA Mediatech Ultra Fast ink are presented in picture 5. The ISIT Tack Build-up times for the invented papers are over 150 s as the values for the known papers are less than 25 s.

The ISIT Tack Build-up curves and ISIT Tack Build-up times ISIT Tack Build-up time for one known paper both with Sun Challenge and with SICPA Mediatech Ultra Fast ink are presented in picture 6. The values for the known paper are less than 10 s.

5.4 K&N Ink Absorption Test and Gurley-Hill Porosity

The K&N Ink Absorption and Gurley-Hill results were following for four invented papers and for known papers.

|  | K&N |
|---|---|
| Coating colour 3/sample 12 | 1.5 |
| Coating colour 5/sample 8 | 1.3 |
| Coating colour 6/sample 10 | 1.3 |
| UPM Cote 60 gsm | 7.7 |
| UPM Ultra 70 gsm | 15.5 |

The invented papers have much lower ink absorption.

5.5 Ink

1. Sun Challenge $T_{max}$ value for Sun Challenge ink was 286 s and for SICPA Mediatech Ultra Fast the values were between 100-150 s.

|  |  | Ink | | | | |
|---|---|---|---|---|---|---|
|  |  | SICPA Mediatech Ultra Fast | | | | Sun Challenge |
|  |  | Colour | | | | |
|  |  | Yellow | Magenta | Cyan | Black | Cyan |
|  |  |  |  | Hue |  |  |
|  |  | 2300K | 5000K | 6700K | 9000K | 3925-02 |
|  |  |  |  | Lot |  |  |
|  |  | 183480 | 183481 | 183482 | 183483 | 95364 |
| Tack (100 m/min) |  | 128 | 120 | 112 | 120 | 169 |
| Stability (200 m/min) | Start | 153 | 128 | 118 | 130 | 176 |
|  | Max | 164 | 132 | 121 | 138 | 196 |
| Stability | Tmax (s) | 150 s | 108 s | 101 s | 145 s | 286 s |

5.6 Conclusion

The invented papers have clearly more closed surface than the known papers have. The SICPA Mediatech Ultra Fast looses the solvent much faster the Sun Challenge and is therefore more favorable for low temperature in heatset offset drying.

One can state according to the results that the known uncoated super calendered paper UPM Max 56 g/m² (SCO) has a long ISIT Tack Build-up time over 100 s and a high IGT Set-off value of 0.50 print density units at 30 s delay time because the capillary suction of UPM Max is slow due to the large pore radius of an uncoated paper that can be concluded from the low Gurley Hill Air Permeance value that is clearly under 1000 s. It is possible to make a difference between the uncoated porous supercalendered papers and non-porous coated papers with the Gurley-Hill Air Permeance method.

Example 5

An example of the concept of the heatset offset method meant for the invented paper is described here:

| | |
|---|---|
| Printing machine: | Albert Frankenthal A101-S |
| Printing Speed: | 6.2 m/s |
| Printing ink: | SICPA Mediatech Ultra Fast |
| Fountain solution: | 3% of SICPA Sol Alcofree additive, 97% tap Water |
| Drying: | Web end temperature 95° C. |
| Length of the dryer | 8 m |

The printed product can also be printed with similar ink in other printing conditions and by using other raw materials in the printing process.

Another paper with the invented properties is presented that can be used in addition to the heatset offset method also with gravure printing method. The stages in papermaking are the same as before mentioned but coating recipe is following:

| | |
|---|---|
| Talc (C10XO) | 60 parts |
| Kaolin (Supragloss 95) | 40 parts |
| CMC (FinnFix 10) | 0.8 parts |
| Styreine maleic acid (Raiprint D200) | 1 part |
| Calcium stearate (Raisacoat 50) | 0.5 parts |
| Optical brightener (Optiblanc NF) | 0.2 parts |

The solid content of the coating colour was 59% and pH 8.0. Target coat weight was 10+10 g/m². Moisture content target before calendaring was 5.5%. The base papers were LWC base papers containing 40% of chemical pulp and 60% of mechanical pulp (ground wood) and the basis weights were 43 and 41 g/m². The smoother side (upper side) was coated first. The calendering temperatures (upper/middle/lower) were 100° C., 90° C. and 80° C.

The paper fulfils the requirements for a heatset offset paper but in addition to that also the smoothness and compressibility requirements for a gravure paper have been taken into account in the coating recipe. For this reason the starch in the recipe has been taken away and the latex is even softer ($T_g$–20° C.)

A third paper with the invented properties is presented that resembles more a supercalendered SC-paper. The stages in papermaking are the same as before mentioned but coating recipe is following:

| | |
|---|---|
| SB-latex (Rhodopas SB388) | 100 parts |
| Talc (C10XO) | 100 parts |

The solid content of the coating colour was 20.0% and pH 7.8 and the coating method was two-sided Sym Sizer. Target coat weight was 2+2 g/m². Moisture content target before calendaring was 5.3%. The base paper was typical SC-paper with an ash content of 30% and a fiber mix of 20% chemical pulp and 80% mechanical. The basis weights were 56 g/m². The calendering temperatures (upper/middle/lower) were 100° C., 90° C. and 80° C.

The papers can be coated with different coating and calendaring methods and the base paper can consist of different raw materials. The coating recipes can be used for coating a board enabling the possibility of using the heatset offset printing method. The drawings and the thereto attached description is only intended to clarify the inventive concept. In detail, for example pigments, furnishes, coating binders, coating and calendering methods, uncoated papers for example SC-papers or boards, the invention may vary within the scope of the claims.

What is claimed is:

1. A printing method comprising transferring a pigment carrier/ink to a coated paper substrate which is non-porous, the coated paper substrate having an oleophilic surface having a Gurley-Hill permeance value greater than 5000 s/100 ml, the coated paper substrate having an IGT ink set-off value greater than 0.60 print density units at 30 s delay time, wherein the coating on the paper substrate comprises platy pigment particles having an aspect ratio of at least 4 and an additional surface adjusting agent, the platy pigment particles comprising talc, the platy pigment particles and additional surface adjusting agent in amounts effective for providing the coated paper with a Gurley-Hill permeance value greater than 5000 s/100 ml.

2. The printing method of claim 1 wherein the platy pigment particles include kaolin and talc having an aspect ratio of more than 25 and mixtures thereof, and the additional surface adjusting agent is selected from the group consisting of latex having a low $T_g$, a cross-linked latex, styrene maleic anhydride and mixtures thereof, the amount of talc, the amount of additional surface adjusting agent, the amount of latex, the $T_g$, the extent of cross-linking of the latex providing the coated paper with a Gurley-Hill permeance value greater than 5000 s/100 ml.

3. The printing method according to claim 1, wherein the substrate is a surface treated paper or board web and the substrate is fed through at least one printing unit.

4. The printing method according to claim 1 or 2, wherein ISIT Tack Build-up time of the substrate is over 100 s for ink whose stability value in Tack-O-Scope tack measurement is between 270-300 s.

5. The printing method according to claim 1 or 2, wherein heatset offset printing or gravure printing are used in the printing method.

6. The printing method according to claim 5, wherein the method further includes drying a web, wherein the web temperature after drying is under 115° C. measured from the web right after the dryer.

7. The printing method according to claim 6, wherein the web temperature after drying is under 100° C.

8. The printing method according to claim 1, wherein ISIT Tack Build-up time of the substrate is over 100 s for ink whose ink stability value in Tack-O-Scope tack measurement is under 200 s.

9. A printing method comprising:
providing a coated non-porous paper substrate which has an oleophilic surface having a Gurley-Hill permeance value greater than 5000 s/100 ml; and
printing the substrate with a pigment carrier/ink, the substrate having an IGT ink set-off value greater than 0.60 print density units at 30 s delay time, the printing selected from the group consisting of heatset offset printing and gravure printing, wherein the coating on the paper substrate comprises talc having an aspect ratio of more than 25 and an additional surface adjusting agent, the coating composition providing the coated paper with a Gurley-Hill permeance value greater than 5000 s/100 ml.

10. The printing method of claim 9 wherein the additional surface adjusting agent is selected from the group consisting of latex having a low $T_g$, a cross-linked latex, styrene maleic anhydride and mixtures thereof, the amount of talc, the amount of additional surface adjusting agent, the amount of latex, the $T_g$, the extent of cross-linking of the latex providing the coated paper with a Gurley-Hill permeance value greater than 5000 s/100 ml.

11. The printing method according to claim 9 wherein ISIT Tack Build-up time of the substrate is over 100 s for ink whose stability value in Tack-O-Scope tack measurement is between 270-300 s.

12. The printing method according to claim 9, wherein the method further includes drying a web, wherein the web temperature after drying is under 115° C. measured from the web right after the dryer.

13. The printing method according to claim 12, wherein the web temperature after drying is under 100° C.

14. The printing method according to claim 9, wherein the pigment carrier/ink has an ink stability value in Tack-O-Scope tack measurement under 200 s.

15. A heatset offset printing method comprising:
providing a coated non-porous paper substrate which has an oleophilic surface having a Gurley-Hill permeance value greater than 5000 s/100 ml; and
heatset offset printing the substrate with a pigment carrier/ink, the substrate having an IGT ink set-off value greater than 0.60 print density units at 30 s delay time, wherein the coating on the paper substrate comprises talc having an aspect ratio of more than 25 and an additional surface adjusting agent, the coating composition providing the coated paper with a Gurley-Hill permeance value greater than 5000 s/100 ml.

16. The printing method of claim 15 wherein the additional surface adjusting agent is selected from the group consisting of latex having a low $T_g$, a cross-linked latex, styrene maleic anhydride and mixtures thereof, the amount of talc, the amount of additional surface adjusting agent, the amount of latex, the $T_g$, the extent of cross-linking of the latex providing the coated paper with a Gurley-Hill permeance value greater than 5000 s/100 ml.

17. The printing method according to claim 15 wherein ISIT Tack Build-up time of the substrate is over 100 s for ink whose stability value in Tack-O-Scope tack measurement is between 270-300 s.

18. The printing method according to claim 15, wherein the method further includes drying a web, wherein the web temperature after drying is under 115° C. measured from the web right after the dryer.

19. The printing method according to claim 18, wherein the web temperature after drying is under 100° C.

20. The printing method according to claim 15, wherein ISIT Tack Build-up time of the substrate is over 100 s for ink whose ink stability value in Tack-O-Scope tack measurement is under 200 s.

21. A printing method comprising transferring a pigment carrier/ink to a coated paper substrate which is non-porous, the coated paper substrate having an oleophilic surface having a Gurley-Hill permeance value greater than 5000 s/100 ml, the coated paper substrate having an IGT ink set-off value greater than 0.60 print density units at 30 s delay time, wherein the coating on the paper substrate comprises talc having an aspect ratio of more than 25 and an additional surface adjusting agent selected from the group consisting of latex having a low $T_g$, a cross-linked latex, styrene maleic anhydride and mixtures thereof, the amount of talc, the amount of additional surface adjusting agent, the amount of latex, the $T_g$, the extent of cross-linking of the latex providing the coated paper with a Gurley-Hill permeance value greater than 5000 s/100 ml.

22. The printing method of claim 21 wherein the coating further comprises platy pigment particles having an aspect ratio of at least 4.

23. The printing method according to claim 21 wherein ISIT Tack Build-up time of the substrate is over 100 s for ink whose stability value in Tack-O-Scope tack measurement is between 270-300 s.

24. The printing method according to claim 21, wherein the method further includes drying a web, wherein the web temperature after drying is under 115° C. measured from the web right after the dryer.

25. The printing method according to claim 24, wherein the web temperature after drying is under 100° C.

26. The printing method according to claim 21, wherein ISIT Tack Build-up time of the substrate is over 100 s for ink whose ink stability value in Tack-O-Scope tack measurement is under 200 s.

* * * * *